United States Patent
Hayashi et al.

[11] Patent Number: 5,686,816
[45] Date of Patent: Nov. 11, 1997

[54] CHARGING CONTROL CIRCUIT

[75] Inventors: Takahiro Hayashi; Kouichi Kunitomo, both of Yokohama, Japan

[73] Assignee: Matsushita Electric Industrial Co., Ltd., Osaka, Japan

[21] Appl. No.: 757,655

[22] Filed: Nov. 29, 1996

[30] Foreign Application Priority Data

Nov. 30, 1995 [JP] Japan ................. 7-334182

[51] Int. Cl.$^6$ ................................ H02J 7/00
[52] U.S. Cl. ................ 320/30; 320/31; 320/32; 320/15; 320/2
[58] Field of Search .................. 320/30, 31, 32, 320/39, 15, 2

[56] References Cited

U.S. PATENT DOCUMENTS

| | | |
|---|---|---|
| 5,049,804 | 9/1991 | Hutchings ............... 320/31 X |
| 5,157,320 | 10/1992 | Kuriloff ................. 320/39 |
| 5,164,652 | 11/1992 | Johnson et al. ......... 320/15 X |
| 5,184,059 | 2/1993 | Patino et al. ........... 320/15 |
| 5,204,611 | 4/1993 | Nor et al. ............... 320/39 X |
| 5,387,820 | 2/1995 | Imagawa . | |
| 5,420,493 | 5/1995 | Hargadon et al. ....... 320/15 |
| 5,449,997 | 9/1995 | Gilmore et al. ......... 320/39 |
| 5,534,765 | 7/1996 | Kresinger et al. ....... 320/30 |
| 5,606,240 | 2/1997 | Kokuga et al. ......... 320/32 |

FOREIGN PATENT DOCUMENTS 0394074 10/1990 European Pat. Off. .
2239567 7/1991 United Kingdom .

*Primary Examiner*—Peter S. Wong
*Assistant Examiner*—K. Shin
*Attorney, Agent, or Firm*—Lowe, Price, LeBlanc & Becker

[57] ABSTRACT

A charging control circuit is disclosed which comprises: a 1st connector (17) receiving an input supply power (34); a 2nd connector (30) for supplying a charging supply power (35) to charge either of a 1st (Ni-Cd) or 2nd (Lithium ion) battery (33a, 33b) and receiving a discharging supply power (36) from the battery; a kind detection portion (15) for detecting which of the 1st and 2nd kind of battery is to be charged; a voltage detection circuit for detecting an emf of the battery to be charged; a current detection circuit for detecting a charging current to the battery to be charged; a REF signal generation portion (15) for generating a REF signal (38) in accordance with outputs from the kind detection portion, the current detection circuit, and the voltage detection circuit; a difference providing portion (111) for providing a difference between the REF signal and the detected emf; and a charging supply power generation circuit for generating the charging supply power from the input supply power according to the output of the difference providing portion (111). The Ni-Cd battery is charged by a constant current and the lithium ion battery, by a constant current and a constant voltage (4.1 V). Completion of charging is detected by a drop of emf of Ni-Cd and decrease in the charging current to Lithium ion battery.

9 Claims, 5 Drawing Sheets

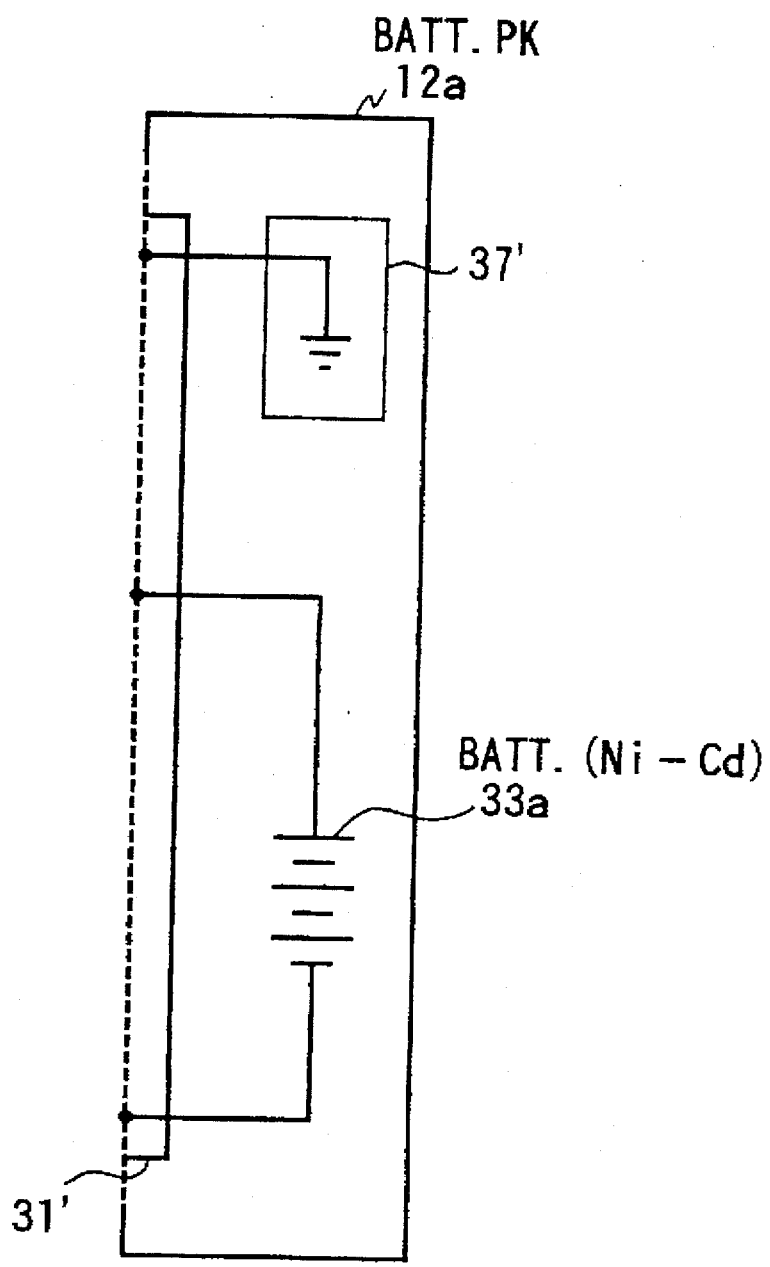

CHARGING CONTROL CIRCUIT

BACKGROUND OF THE INVENTION

1. Field of the Invention

This invention relates to a charging control circuit for charging one of a plurality of kinds of batteries in a portable unit from an external supply power.

2. Description of the Prior Art

A charging control circuit charging either of a first or second kind of a battery in a portable unit from an external supply power is known.

FIG. 5 is a block diagram of such a prior art charging control circuit. When a nickel-cadmium battery is used as the battery 20, the switch 29 is turned to a contact cl and if a lithium ion battery is used as the battery 20, after an emf (electromotive force) of the lithium ion battery reaches 4.1 V, the switch 29 is turned to a contact c2 in response to the microprocessor 25 which detects the kind of the battery 20. Then, the nickel-cadmium battery is charged by a constant current and the Lithium ion battery is charged by a constant current and a constant voltage after the electromotive force reached to 4.1 V. The microprocessor 25 detects the kind of the battery attached from a signal from a terminal 28. An FET (field effect transistor) driver 24 generates a charging supply power from the supply power from the contact C1 or the voltage regulator 210 under the control circuit 26 in accordance with the detected kind of the battery.

This prior art charging control circuit requires the switch 29, the connectors 211 and 27 having four passages and the voltage regulator 210.

SUMMARY OF THE INVENTION

The aim of the present invention is to provide an improved charging control circuit.

According to the present invention, a charging control circuit is provided, which comprises: a first connector receiving an input supply power; a second connector for supplying a charging supply power to either of a first or second kind of battery to be charged and receiving a discharging supply power from either of the first and second kind of battery; a kind detection portion for detecting which of the first and second kind of battery is to be charged; a voltage detection portion for detecting an electromotive force of the first or second kind of battery to be charged; a current detection portion for detecting a charging current to the first or second kind of battery to be charged; a reference signal generation portion for generating a reference signal in accordance with outputs from the kind detection portion, the current detection portion, and the voltage detection portion; a difference providing portion for providing a difference between the reference signal and the detected electromotive force; and a charging supply power generation portion for generating the charging supply power from the input supply power in accordance with the output of the difference providing portion.

In this charging control circuit, the reference signal generation portion generates the reference signal such that if the first kind of battery is to be charged, the charging supply power generation portion generates the charging supply power from the input supply power with substantially no voltage drop.

In this charging control circuit, the reference signal generation portion generates the reference signal such that if the second kind of battery is to be charged, the charging supply power generation portion generates the charging supply power having a constant current before the electromotive force detection portion detects a predetermined voltage, generates the charging supply power to maintain the predetermined voltage after the electromotive force detection portion detects the predetermined voltage.

This charging control circuit may further comprise a charging completion detection portion, having a memory storing data of the electromotive force, for detecting completion of charging the first kind of battery when the detected electromotive force decreases from the data of electromotive force in memory with a predetermined difference and in response to the completion, the reference signal generation portion generating the reference signal such that the charging supply power generation portion generates substantially no charging current.

This charging control circuit may further comprise a charging completion detection portion for detecting completion of charging the second kind of battery to be charged when the detected discharge current is smaller than a predetermined value and in response to the completion, the reference signal generation portion generating the reference signal such that the charging supply power generates substantially no charging current.

In the charging control circuit, the first kind of battery may be a nickel-cadmium battery.

In the charging control circuit, the first kind of battery may be a nickel-hydrogen battery.

In the charging control circuit, the second kind of battery is a lithium ion battery.

In the charging control circuit, the charging supply power generation portion comprises an FET and a bias controlling circuit for controlling a bias of the FET in accordance with an output of the difference portion.

BRIEF DESCRIPTION OF THE DRAWINGS

The object and features of the present invention will become more readily apparent from the following detailed description taken in conjunction with the accompanying drawings in which:

FIG. 3 is a circuit diagram of a battery pack including a nickel-cadmium battery of this embodiment;

The same or corresponding elements or parts are designated with like references throughout the drawings.

DETAILED DESCRIPTION OF THE INVENTION

Hereinbelow will be described an embodiment of this invention.

Figure 1:
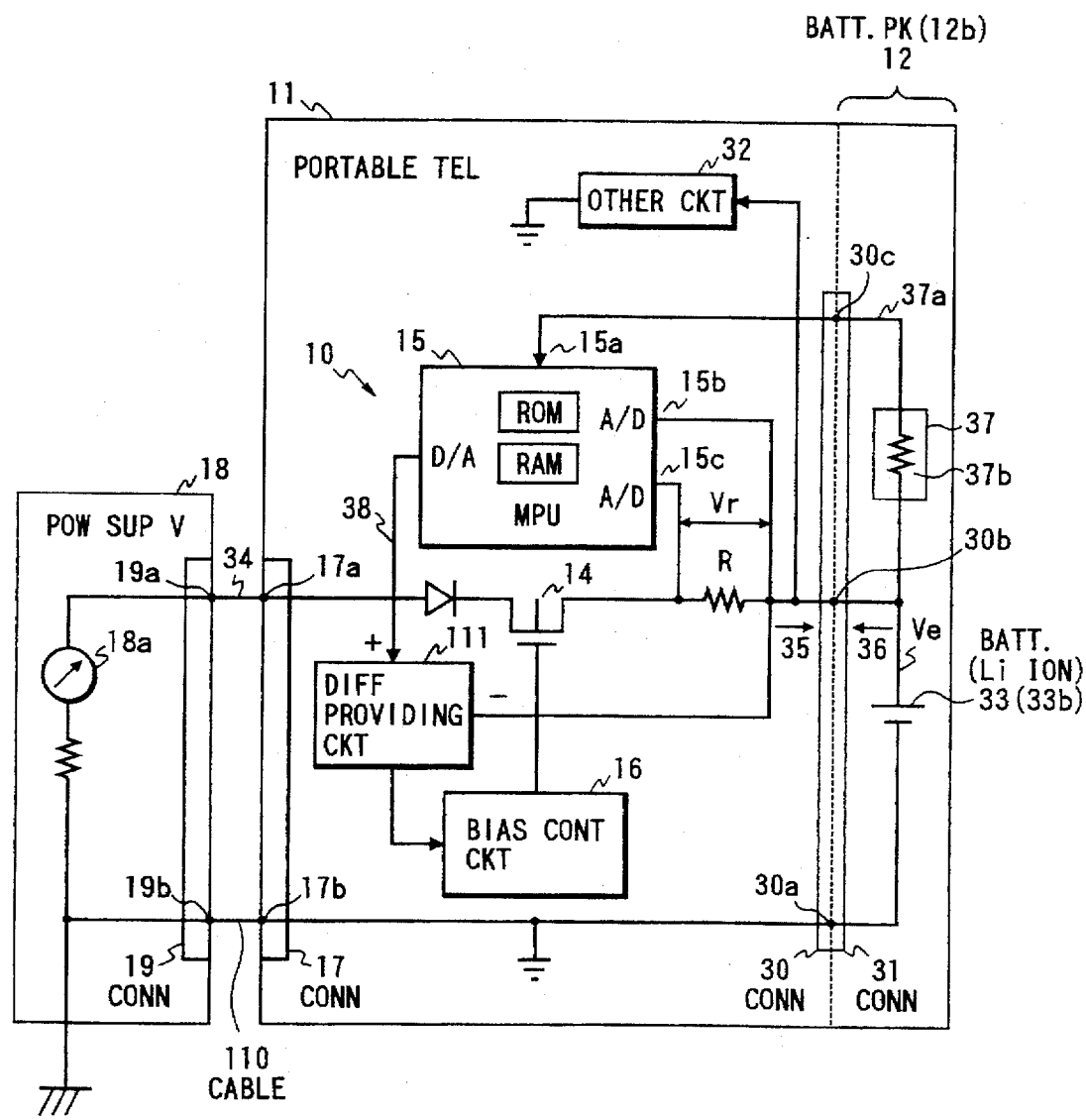
FIG. 1 is a block diagram of a charging control circuit of an embodiment of this invention.

FIG. 1 is a block diagram of a charging control circuit of the embodiment of this invention.

A portable telephone 11 as a potable unit comprises a charging control circuit 10, including a connector 17 for receiving a supply power from a power supply unit 18 and a connector 30 for coupling a battery pack 12 (12a or 12b) to the charging control circuit 10, and other circuits 32 for communication.

The power supply unit 18 comprises a current source 18a supplying substantially a constant current and a connector 19 having contacts 19a and 19b. A cable 110 couples the connector 19 to the connector 17 to supply the supply power from the power supply unit 18.

The battery pack 12 comprises a connector 31 for coupling the charging control circuit 10 to the battery pack 12, a battery 33a or 33b, and a kind of battery signal generator 37 for supplying a kind signal indicative of a kind of the battery 33a or 33b to a contact 30c. FIG. 3 is a circuit diagram of a battery pack 12a including a nickel-cadmium battery 33a. In this embodiment, either of a battery 33a of nickel-cadmium battery and a battery 33b of a lithium ion battery is used. That is, a user attaches either of a battery pack 12a including the nickel-cadmium battery 33a or a battery pack 12b including the lithium-ion battery 33b to the portable telephone 11. A nickel hydrogen-battery can be also used in place of the nickel-cadmium battery 33a. FIG. 1 shows the case that a battery pack 12b includes the lithium ion battery 33b. The kind of battery signal generator 37 includes a resistor and generates the kind signal 37a from the emf of the lithium ion battery 33b.

In FIG. 3, the kind of battery signal generator 37 of the battery pack 12a grounds the contact 30c of the connector 31 to provide L level indicating that the kind of the battery to be charged (attached) is nickel cadmium battery 33a to a microprocessor 15 in the charging control circuit. Contrary, as shown in FIG. 1, the kind of battery signal generator 37 provides H level indicating that the kind of the battery to be charged (attached) is lithium ion battery 33b to the microprocessor 15.

The charging control circuit 10 comprises the connector 17 for receiving an input supply power 34 through contact 17a, the connector 30 for outputting a charging supply power 35 to charge either of a first or a second kind of battery, i.e., the nickel-cadmium battery 33a or the lithium ion battery 33b and receiving a discharging supply power 36 from the battery provided in the battery pack attached to the portable telephone 11 in an operation mode, the microprocessor (mpu) 15 for detecting which of said first and second kind of battery is to be charged or attached to the portable telephone 11 by checking the kind signal indicative of the kind of the battery 33a or 33b through an input port 15 and generating a reference signal 38 in accordance with the detected kind of battery 33, the emf from the battery to be charged, and a charging current 35; a difference providing circuit 111 for providing a difference between the emf and reference signal from the microprocessor 15; a bias control circuit 16 for generating a bias signal in accordance with the difference from the difference providing circuit 111, an FET driver 14 for generating the charging supply power 35 from the Input supply power in accordance with bias signal from the bias control circuit 16. The charging current 35 is detected by a resistor R connected to the FET driver 14 and to the contact 30b of the connector 30 in series. One ends of the resistor R is connected to an A/D conversion input 15b of the microprocessor 15 as the emf of the battery. The other end is connected to an A/D conversion input 15c of the microprocessor 15.

The microprocessor 15 detects the intensity of the charging current by detecting a voltage difference Vr between the resistor R through A/D conversion Inputs 15b and 15c and detects a completion of charging by detecting a decrease in voltage after saturation of emf (peak voltage) when the battery is the nickel-cadmium 33a and a decrease in the charging current of the charging supply power 35 to a predetermined voltage V1 when the battery is the lithium ion battery.

Figure 2A:
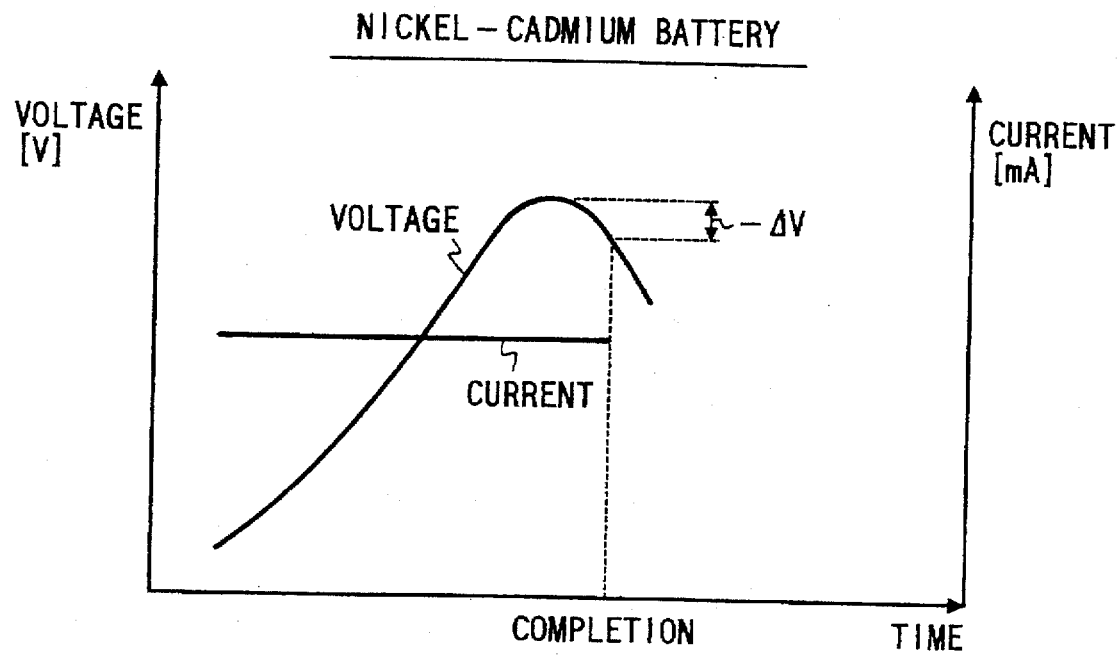
FIGS. 2A and 2B are graphic drawings of the embodiment.
Figure 2B:
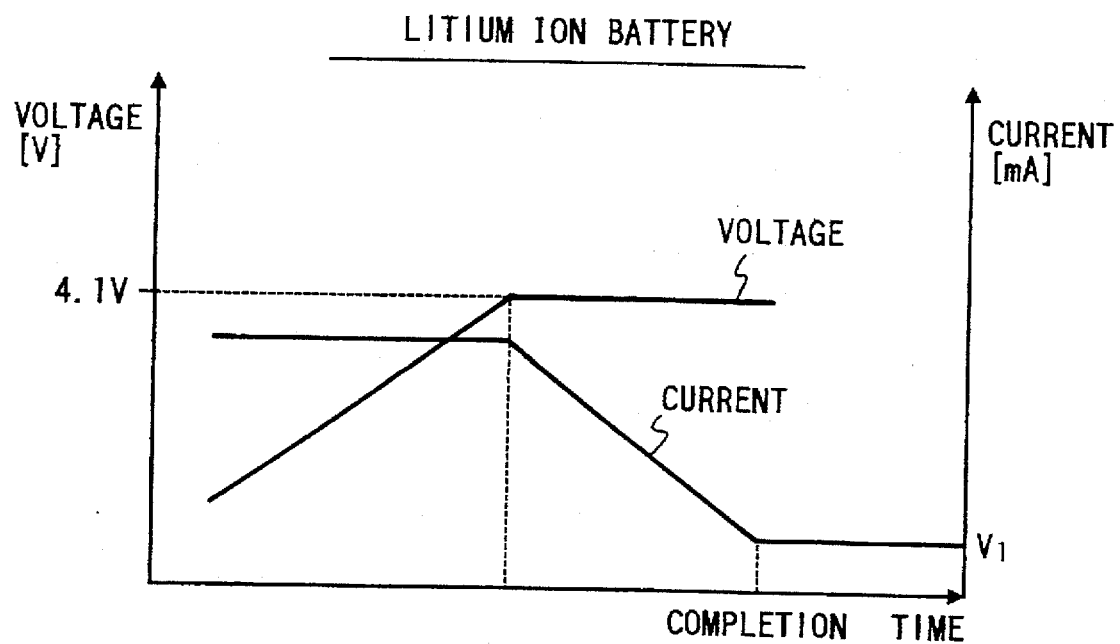

FIGS. 2A and 2B are graphic drawings of the embodiment. FIG. 2A shows a charging voltage (emf) characteristic and a charging current characteristic of the nickel-cadmium battery 33a or a nickel-hydrogen battery. FIG. 2B shows a charging voltage (emf) characteristic and a charging current characteristic/of the lithium Ion battery 33b.

The nickel-cadmium battery 33a is charged by a constant current. The voltage of the nickel-cadmium battery (emf) slightly decreases after a saturation of charging. Therefore, when the microprocessor 15 detects the decrease in the emf 35, that is, $-\Delta V$, the microprocessor 15 turns off the FET driver 14.

On the other hand, the lithium ion battery 33b is charged by a constant current before the emf 35 reaches to 4.1 V. When the emf 35 reaches to 4.1 V, the lithium ion battery 33b is charged by a constant voltage of 4.1 V. Then, the microprocessor monitors the charging current represented by the voltage difference Vr between the resistor R and when the charging current decreases a predetermined value V1, the microprocessor 15 judges the completion of charging. Then, the microprocessor 15 generates the reference signal indicative of stop of charging. In response to this the difference producing circuit 111 generates the bias control signal indicative of stop of charging. In response to this, the bias control circuit 16 generates the bias signal indicative of stop of charging. In response to this, the FET driver 14 stops charging, that is, the FET driver 14 generates the charging supply power to have substantially no charging current.

The difference providing circuit 111 generally comprises a differential amplifier for providing a difference between the reference signal 38 and the emf from the battery 33.

Figure 4:
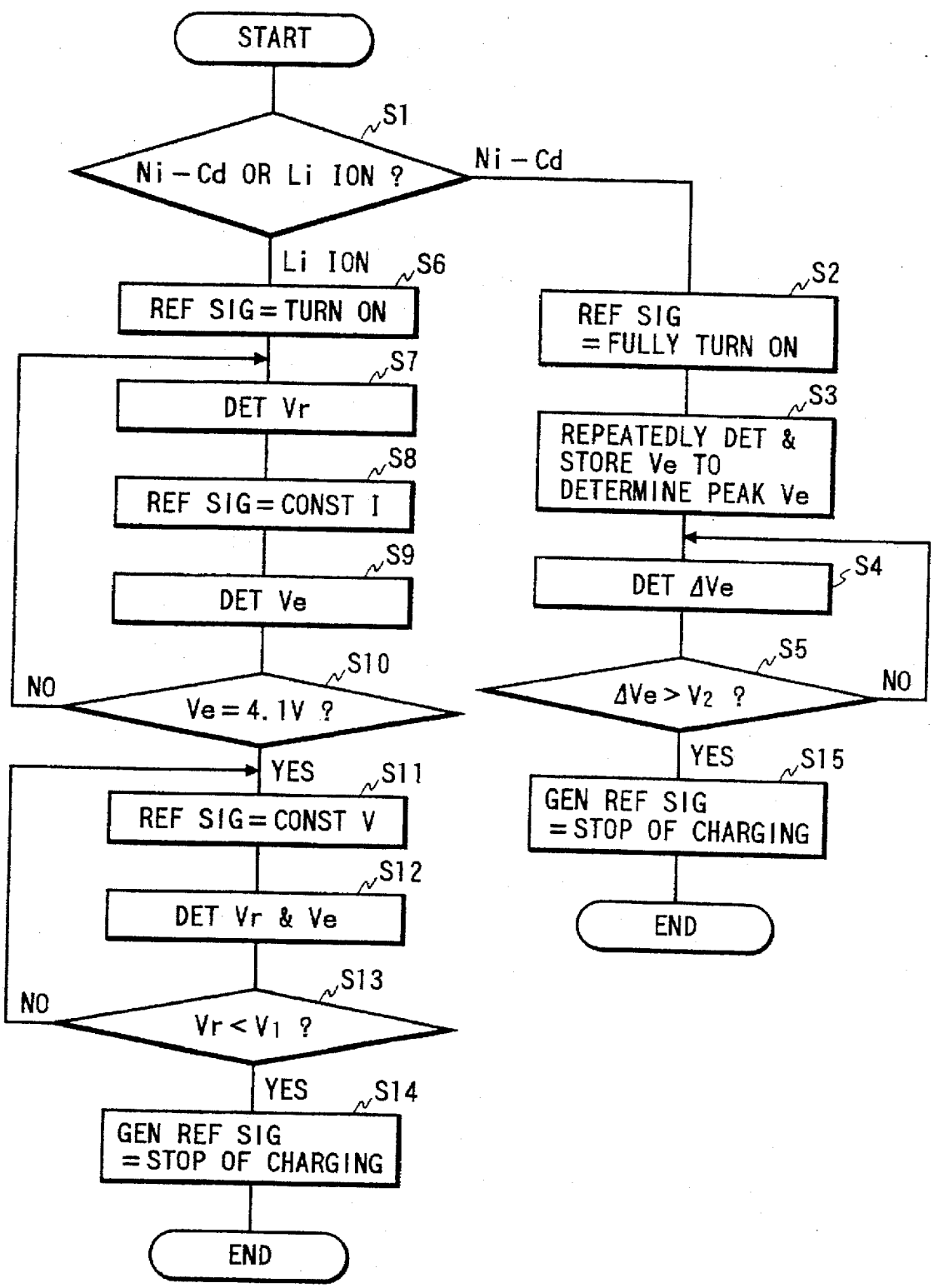
FIG. 4 is a diagram of a flow chart of this embodiment.
Figure 5:
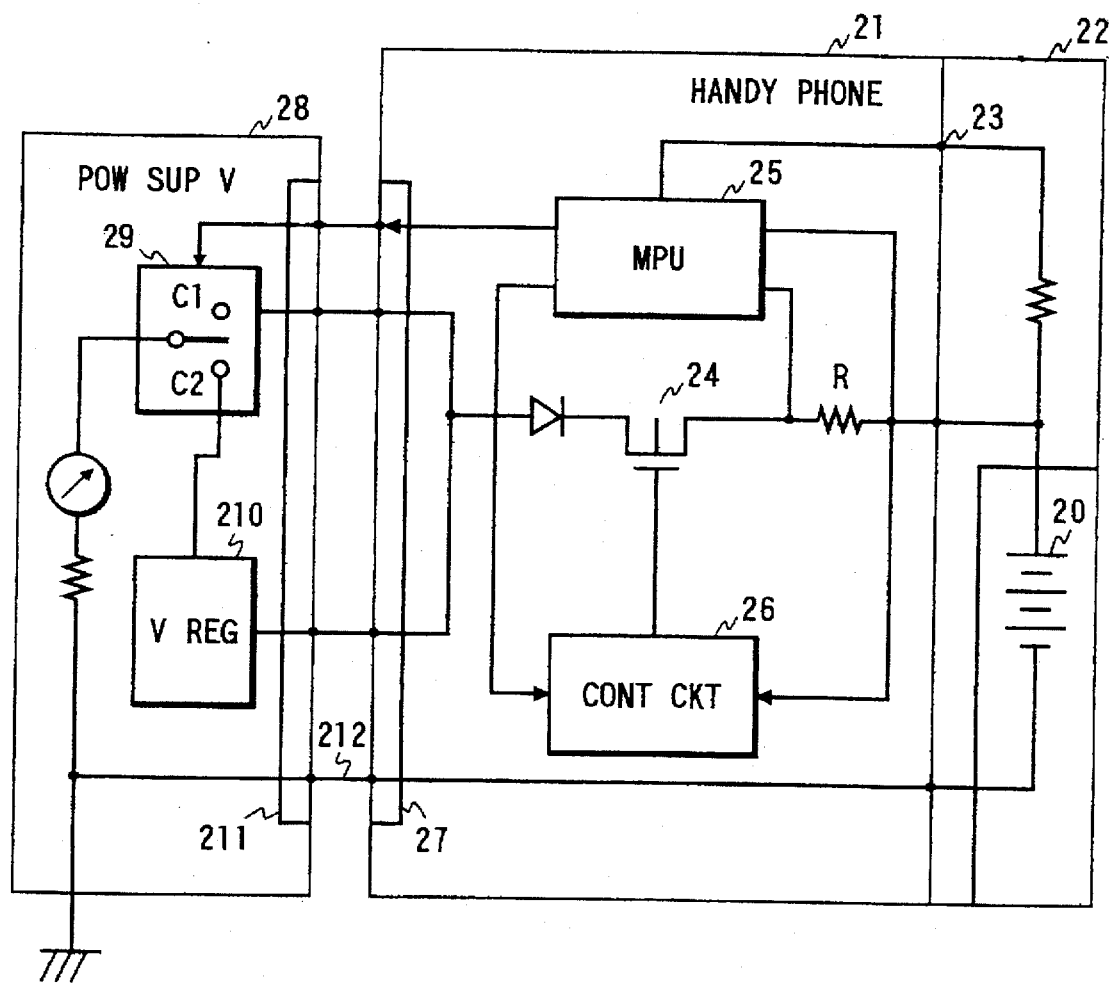
FIG. 5 is a block diagram of such a prior art charging control circuit.

FIG. 4 is a diagram of a flow chart of the microprocessor 15 of this embodiment.

In step s1, the microprocessor 15 detects the kind signal and makes a decision as to whether the battery to be charged is the nickel-cadmium battery 33a (L level) or the lithium ion battery 33b (H level).

If the battery to be charged is nickel-cadmium battery 33a, processing proceeds to step s2. The microprocessor 15 generates the reference signal 38 indicative of fully turning on the FET driver 14 in step More specifically, the microprocessor 15 includes a ROM for storing programs and a table for generating the reference signal 88. Therefore, the microprocessor 15 generates the reference signal 88 indicative of fully turning on the FET driver 14 with reference to the table and reads data corresponding to the condition of charging the nickel cadmium battery 33a. That is, the FET driver 14 generates the charging supply power from the input supply power with substantially no voltage drop.

In the following step s3, the microprocessor 15 detects and stores the emf Ve every predetermined interval in a RAM thereof and determines a peak of the emf Ve. In the following step s4, the microprocessor 15 detects the emf Ve again and calculates a difference $\Delta Ve$ between the peak and the present emf. If the $\Delta Ve$ is not larger than a predetermined value V2, processing returns to step s4 and repeats this processing until the $\Delta Ve$ is larger than the predetermined value V2.

If the $\Delta Ve$ is larger than the predetermined value V2 in step s5, the microprocessor 15 judges the completion of charging the nickel-cadmium battery 33a and in step s15 the microprocessor 15 generates the reference signal indicative of stop of charging.

In step s1, if the battery to be charged is lithium ion battery 33b, processing proceeds to step s6. The microprocessor 15 generates the reference signal 38 indicative of suitably turning on the FET driver 14 in step s6.

In the following step s7, the microprocessor 15 detects the voltage difference Vr and determines the reference signal to obtain a constant charging current.

In the following step s9, the microprocessor 15 detects the emf Ve and makes decision as to whether or not the emf Ve reaches 4.1 V. If the emf does not reach 4.1 V, processing returns to step s7 and repeats this processing until the emf Ve reaches 4.1 V.

If the emf Ve reaches 4.1 V in step s10, the microprocessor 15 generates the reference signal indicative of a constant voltage of 4.1 V In accordance with the detected emf In step s11. In the following step s12, the microprocessor 15 detects the voltage difference Vr and the emf Ve. Then, in step s13 the microprocessor 15 judges the completion of charging the lithium ion battery 33b, that is, the voltage difference is less than V1. If the charging has not completed processing returns to step s11. If the charging has completed, that is the charging current decreases to a predetermined level, the microprocessor 15 generates the reference signal Indicative of stop of charging in step s14 and ends the processing.

As mentioned the microprocessor 15 generates the reference signal on the basis of the detected emf Ve and the detected voltage difference Vr, that is, the charging current such that the difference between the reference signal and the emf controls the FET driver 14 such that the charging current Is constant, the emf during charging is constant, and charging is stopped.

The power supply unit 18 generates the supply power having a voltage between 5 to 7 V because this voltage of supply power of the power supply unit 18 should be more than a voltage which is 1.3 times emf of three nickel cadmium batteries in series. That is the voltage should be more than 4.68 V (1.2 V×3×1.3). Then, in consideration of a voltage drop in the FET driver 14 or the like. The voltage of the supply power of the power supply unit 18 should be more than 5 V. Contrary, if the lithium battery 33b is charged, the voltage of charging supply power should be kept equal or less than 4.1 V, so that the FET driver 14 develops a voltage drop which is converted to a heat to supply 4.1 V. Therefore, the voltage of the supply power of the power supply unit should be less than 7 V.

As mentioned, the difference providing circuit 111 providing the difference between the reference signal generated by the microprocessor 15 in accordance with the emf, the charging current, and the kind of the battery to be charged. The charging voltage or the charging current can be controlled by this structure with a simple supply power from the supply power unit 18 through only two lines included in the cable 110.

What is claimed is:

1. A charging control circuit comprising:

a first connector (17) receiving an input supply power (34);

a second connector (30) for supplying a charging supply power (35) to either of a first or second kind of battery (33a or 33b) to be charged and receiving a discharging supply power (36) from either of said first and second kind of battery;

kind detection means (15) for detecting which of said first and second kind of battery is to be charged;

voltage detection means for detecting an electromotive force of said first or second kind of battery to be charged;

current detection means (R) for detecting a charging current to said first or second kind of battery to be charged;

reference signal generation means (15) for generating a reference signal (38) in accordance with outputs from said kind detection means, said current detection means, and said voltage detection means;

difference providing means (111) for providing a difference between said reference signal and said detected electromotive force; and charging supply power generation means for generating said charging supply power from said input supply power in accordance with the output of said difference providing means (111).

2. A charging control circuit as claimed in claim 1, wherein said reference signal generation means generates said reference signal such that if said first kind of battery (33a) is to be charged, said charging supply power generation means generates said charging supply power from said input supply power with substantially no voltage drop.

3. A charging control circuit as claimed in claim 1, wherein said reference signal generation means generates said reference signal such that if said second kind of battery (33b) is to be charged, said charging supply power generation means generates said charging supply power having a constant current before said electromotive force detection means detects a predetermined voltage, generates said charging supply power to maintain said predetermined voltage after said electromotive force detection means detects said predetermined voltage.

4. A charging control circuit as claimed in claim 1, further comprising charging completion detection means, having a memory storing data of said electromotive force, for detecting completion of charging said first kind of battery when said detected electromotive force decreases from said said data of electromotive force in memory with a predetermined difference and in response to said completion, said reference signal generation means generating said reference signal such that said charging supply power generation means generates substantially no charging current.

5. A charging control circuit as claimed in claim 1, further comprising charging completion detection means for detecting completion of charging said second kind of battery to be charged when said detected discharge current is smaller than a predetermined value and in response to said completion, said reference signal generation means generating said reference signal such that said charging supply power generates substantially no charging current.

6. A charging control circuit as claimed in claim 1, wherein said first kind of battery is a nickel-cadmium battery.

7. A charging control circuit as claimed in claim 1, wherein said first kind of battery comprises a nickel-hydrogen battery.

8. A charging control circuit as claimed in claim 1, wherein said second kind of battery comprises a lithium ion battery.

9. A charging control circuit as claimed in claim 1, wherein said charging supply power generation means comprises an FET and a bias controlling circuit for controlling a bias of said FET in accordance with an output of said difference means.

* * * * *